Patented Aug. 3, 1948

2,446,503

UNITED STATES PATENT OFFICE 2,446,503

PROCESS FOR MAKING 5-MONOALKYL-BARBITURIC ACIDS

Wilhelm Wenner, Montclair, N. J., assignor to Hoffmann-La Roche Inc., Nutley, N. J., a corporation of New Jersey No Drawing. Application September 29, 1945, Serial No. 619,414

15 Claims. (Cl. 260—257)

My invention relates to a novel procedure for the preparation of 5-monoalkyl-barbituric acids. Such acids are important intermediates for the manufacture of therapeutically useful barbituric acid derivatives.

I have found that 5-monoalkyl-barbituric acids can be obtained in satisfactory yields by the catalytic hydrogenation of barbituric acid in the presence of at least one stoichiometric molecular amount of a saturated or unsaturated carbonyl compound, such as an acyclic aliphatic aldehyde, an acyclic aliphatic ketone, or a cycloaliphatic ketone. The reaction may be called a reductive alkylation.

The reaction, involving a saturated aliphatic aldehyde, may be represented by the following equation:

(I) 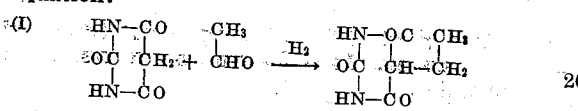

The reaction involving an unsaturated aliphatic aldehyde may be represented by the following equation, the hydrogenation being carried out to effect the reductive alkylation and to saturate the CH=CH linkage:

(II) 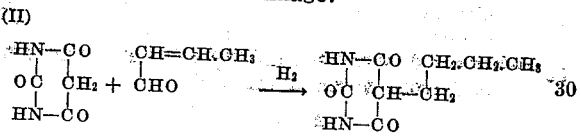

The product of the reaction with croton aldehyde in the preceding equation may also be obtained by procedure (I) by the use of the saturated aldehyde, n-butyraldehyde, according to the following reaction:

(III) 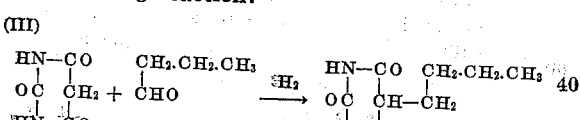

The unsaturated aldehydes appear to be more reactive than the corresponding saturated aldehydes, and are preferred for that reason in certain syntheses.

By reacting barbituric acid with a saturated ketone, the following illustrative equation applies:

(IV) 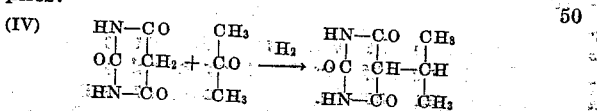

As an example of an unsaturated ketone, I set forth mesityl oxide, which produces 5-($\alpha,\gamma$-dimethylbutyl)-barbituric acid, as shown by the equation:

(V) 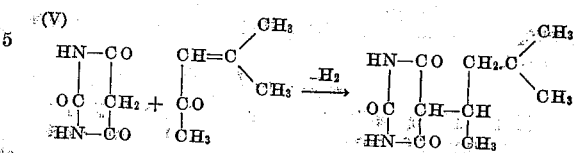

The product 5-($\alpha,\gamma$-dimethylbutyl)-barbituric acid, it will be observed, is also produced by type reaction (IV) by the use of the saturated ketone, methyl-isobutyl-ketone, in the following reaction:

(VI) 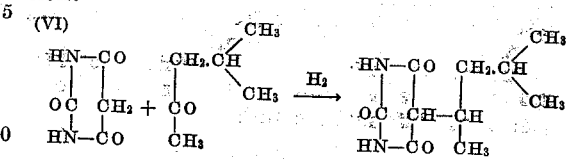

A cycloaliphatic ketone, such as cyclohexanone, may also be employed, according to the reaction:

(VII) 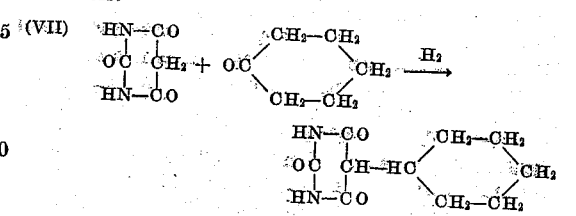

Illustrative examples of aldehydes and ketones which can be employed in my novel process are: acetone, n-butyraldehyde, isobutyraldehyde, methylethyl-ketone, methyl-n-propyl-ketone, diethyl-ketone, n-hexaldehyde, methyl-isobutyl-ketone, acetaldehyde, cyclopentanone, cyclohexanone, mesityl oxide, and croton aldehyde.

The reaction is carried out in general by mixing barbituric acid with a molecular quantity of the aldehyde or ketone, preferably in the presence of a suitable solvent, and subjecting the mixture to catalytic hydrogenation. The temperature at which the reaction is carried out is preferably about 80–110° C., but higher or lower temperatures can be employed.

The pressure may vary within wide limits. A range of 200–1000 p. s. i. is suitable. In general, high pressures speed up the reaction. While condensing agents are not essential, they may be desirable in certain instances. Ammonium acetate and ethylene diamine acetate are set forth as suitable for the purpose.

The reaction is preferentially carried out in the presence of a suitable solvent. In the preparation of 5-isopropyl barbituric acid, acetone is employed as the ketone reactant. In this synthesis, an excess of acetone can be utilized as the solvent. However, lower aliphatic alcohols, such as methanol and ethanol, are particularly useful solvents. Additionally, acetic acid and water are valuable as solvents. The quantity of solvent is variable, as shown in the examples given hereinafter. Mixed solvents can be used.

As catalysts, I may employ nickel, such as Raney nickel, or a noble metal catalyst, such as palladium on charcoal. In general I employ about 10 per cent. of nickel catalyst, or 0.5–1 per cent. of palladium, based upon the weight of barbituric acid used.

The following examples are presented to illustrate various embodiments of my invention. However, it will be understood that the examples are intended to be typical of the broad reactions set out above, and the particular reagents employed, as well as the conditions under which the reactions are carried out, are not to be taken as restrictive in nature. The products may be prepared and used either in a pure or an impure state.

Example 1

22.4 parts by weight of barbituric acid, 20 parts of acetone, 30 parts of absolute alcohol, and 1 part of palladium-charcoal (10% Pd) are hydrogenated at 100° and 700 lbs. pressure until the hydrogen absorption is complete. The mixture is then diluted with a sufficient amount of alcohol to dissolve the formed 5-isopropyl-barbituric acid at 80°, filtered from the catalyst, and allowed to cool. 5-isopropyl-barbituric acid separates in bright shiny crystals of M.P. 212–213°. Evaporation of the mother liquor yields an additional amount.

Example 2

13 parts of barbituric acid, 50 parts of acetone, and 0.5 part of palladium-charcoal (10% Pd) are hydrogenated at 110° and 800 lbs. pressure. Most of the 5-isopropyl-barbituric acid formed crystallizes on cooling. It is filtered. To remove the catalyst, the crystals are dissolved in aqueous sodium hydroxide, and the solution filtered. The colorless filtrate is acidified with hydrochloric acid. 5-isopropyl-barbituric acid separates in colorless crystals of M. P. 212–213°. An additional amount is obtained by evaporation of the acetone mother liquor.

Example 3

13 parts of barbituric acid, 10 parts of acetone, 40 parts of water, and 0.5 part of palladium-charcoal (10%) are hydrogenated at 100° and 500 lbs. pressure. Most of the 5-isopropyl-barbituric acid is crystallized after the reaction. It is filtered, and dissolved in sodium hydroxide. The solution is filtered from the catalyst. Upon addition of hydrochloric acid, 5-isopropyl-barbituric acid separates in good yield. Evaporation of the original mother liquor yields an additional amount.

Example 4

13 parts of barbituric acid, 10 parts of acetone, 30 parts of methanol, and 0.5 part of palladium-charcoal are hydrogenated at 90° and 600 lbs. pressure. After the hydrogenation, most of the 5-isopropyl-barbituric acid has separated. It is filtered, dissolved in dilute sodium hydroxide, and filtered from the catalyst. Addition of dilute sulfuric acid precipitates 5-isopropyl-barbituric acid. The original mother liquor on evaporation yields an additional amount of 5-isopropyl-barbituric acid.

Example 5

13 parts of barbituric acid, 50 parts of acetone, and 2 parts of Raney nickel catalyst are hydrogenated at 90° and 700 lbs. pressure. Water is added and the acetone distilled off. After removal of the acetone, sodium hydroxide is added to dissolve the crystals. The solution is filtered from the catalyst. The filtrate is acidified. 5-isopropyl-barbituric acid separates and is filtered.

Example 6

13 parts of barbituric acid, 10 parts of acetone, 30 parts of acetic acid, and 1 part of palladium-charcoal (10%) are hydrogenated at 100° and 500 lbs. pressure. After hydrogenation, enough acetic acid is added to dissolve the crystals at 100°, the solution filtered and cooled. 5-isopropyl-barbituric acid is obtained in good yield.

Example 7

13 parts of barbituric acid, 10 parts of acetone, 40 parts of water, 2 parts of acetic acid, and 2 parts of Raney nickel are hydrogenated at 400 lbs. and 90°. After the hydrogenation, the mixture is boiled and enough water is added to dissolve the crystals. The solution is filtered from the catalyst and cooled. 5-isopropyl-barbituric acid separates in colorless plates.

Example 8

26 parts of barbituric acid, 20 parts of acetone, 80 parts of methanol, 1 part of ammonium acetate, and 2 parts of Raney metal are hydrogenated at 90° and 400 lbs. pressure. After the hydrogenation, most of the 5-isopropyl-barbituric acid has separated. It is filtered and recrystallized from water.

Example 9

13 parts of barbituric acid, 10 parts of acetone, 30 parts of methanol, and 0.5 part of platinum oxide are hydrogenated at 100° and 400 lbs. pressure. After the hydrogenation, the 5-isopropyl-barbituric acid is extracted with boiling methanol. The hot solution is filtered and evaporated. 5-isopropyl-barbituric acid remains and is recrystallized from water or ethanol.

Example 10

26 parts of barbituric acid, 16 parts of n-butyraldehyde, 100 parts of methanol, and 1 part of palladium-charcoal are hydrogenated at 100° and 600 lbs. pressure. After the hydrogenation, 400 parts of methanol are added, the mixture refluxed and filtered while hot. On cooling, 5-n-butyl-barbituric acid separates. M. P. 208–210°.

Example 11

25 parts of barbituric acid, 16 parts of isobutyraldehyde, 100 parts of methanol, 1 part of ammonium acetate, and 1 part of palladium-charcoal are hydrogenated at 100 lbs. pressure and 100°. After cooling, most of the 5-isobutyl-barbituric acid is crystallized. It is filtered and recrystallized from ethanol. Pure 5-isobutyl-barbituric acid of M. P. 235–236° is obtained.

Example 12

25 parts of barbituric acid, 18 parts of methyl-ethyl-ketone, 120 parts of methanol, 2 parts of ammonium acetate, and 1 part of palladium-charcoal (10% Pd) are hydrogenated at 90° and 1000 lbs. pressure. The resulting solution is filtered from the catalyst. The filtrate is distilled to dryness. 5-sec-butyl-barbituric acid remains behind and is recrystallized from methanol. The pure acid shows M. P. 193–194°.

Example 13

25 parts of barbituric acid, 20 parts of methyl-n-propyl-ketone, 70 parts of methanol, and 1 part of palladium-charcoal (20%) are hydrogenated at 100° and 600 lbs. pressure. The mixture is diluted with methanol, refluxed and filtered while hot. The solution is evaporated and the residue recrystallized from water or from alcohol, yielding 5-(α-methylbutyl)-barbituric acid of M. P. 166°. Instead of methanol, acetic acid can be used as a solvent.

Example 14

25 parts of barbituric acid, 18 parts of diethyl-ketone, 70 parts of methanol, and 1 part of palladium-charcoal are hydrogenated at 90° and 600 lbs. pressure. The mixture is refluxed after addition of 300 parts of methanol, and filtered. After evaporation of the solution, 5-(diethylmethyl)-barbituric acid of M. P. 194–195° is obtained.

Example 15

13 parts of barbituric acid, 11 parts of n-hexaldehyde, 35 parts of methanol, and 1 part of palladium-charcoal (10%) are hydrogenated at 100° and 500 lbs. pressure. The resulting mixture is diluted with 150 parts of methanol, heated to boiling, and filtered hot. The filtrate is evaporated, and the residue is recrystallized from alcohol. Pure 5-n-hexyl-barbituric acid of M. P. 187–188° is obtained.

Example 16

13 parts of barbituric acid, 11 parts of methyl-isobutyl-ketone, 40 parts of methanol, and 1 part of palladium-charcoal (10%) are hydrogenated at 100° and 450 lbs. pressure. The resulting mixture is diluted with methanol, refluxed for 10 minutes, and filtered. On cooling, a small amount of crystals separates. They are filtered off. On evaporation of the filtrate, 5-(α,γ-dimethylbutyl)-barbituric acid is obtained. Recrystallization from alcohol gives the pure acid of M. P. 199°.

Example 17

25 parts of barbituric acid, 15 parts of acetaldehyde, 80 parts of alcohol, and 1 part of palladium-charcoal are hydrogenated at 400 lbs. and 100°. Alcohol is added, the mixture heated to solution, and filtered from the catalyst. On cooling, 5-ethyl-barbituric acid, M. P. 190–191°, separates.

Example 18

13 parts of barbituric acid, 10 parts of cyclopentanone, 35 parts of methanol, and 1 part of palladium-charcoal (10%) are hydrogenated at 100° and 500 lbs. pressure. The partly crystallized mixture is diluted with methanol, heated to solution, and filtered. On cooling, 5-cyclopentyl-barbituric acid separates. Recrystallization from alcohol yields the pure acid of M. P. 220–221°.

Example 19

13 parts of barbituric acid, 12 parts of cyclohexanone, 50 parts of alcohol, and 1 part of palladium-charcoal (5%) are hydrogenated at 100° and 250 lbs. pressure. The reaction product is largely crystallized. It is filtered and dissolved in dilute sodium hydroxide. The solution is filtered from the catalyst, and the filtrate acidified with dilute sulfuric acid. 5-cyclohexyl-barbituric acid separates and is recrystallized from alcohol. M. P. 249–252°.

Example 20

13 parts of barbituric acid, 8 parts of croton aldehyde, 3 parts of palladium-charcoal (2%), and 30 parts of methanol are hydrogenated at 90–100° C. and 600 lbs. pressure for 15 hours. The mixture is refluxed with 300 parts of methanol and filtered hot from the catalyst. The clear, colorless filtrate is evaporated to dryness. 5-n-butyl-barbituric acid separates crystalline. It is recrystallized from water. The pure acid shows M. P. 192–194° and is identical with the product prepared according to Example 10.

Example 21

20 parts of barbituric acid, 16 parts of mesityl oxyde, 1 part of palladium-charcoal (2%), and 35 parts of methanol are hydrogenated at 90° C. and 870 lbs. pressure for 20 hours. The mixture is filtered and the filtrate is evaporated to dryness. The residue is recrystallized from water, giving the product 5-(α,γ-dimethyl-butyl)-barbituric acid, melting at 199° C.

Example 22

13 parts of barbituric acid, 8 parts of acetone, 24 parts of methanol, 1 part of ethylenediamine, 2 parts of acetic acid, and 0.5 part of palladium-charcoal (20%) are hydrogenated at 100° and 700 lbs. pressure for 5 hours. The solution is diluted with methanol until most of the crystals dissolve on refluxing. It is filtered hot, leaving 3 parts residue which on dissolving and acidification yields 1.2 parts of unchanged barbituric acid. From the methanol solution, 9.1 parts of crude 5-isopropyl-barbituric acid, M. P. 209–211°, crystallizes on cooling. 0.8 part of M. P. 206–208°, is isolated from the remaining mother liquor.

In the foregoing examples, the term "parts" will be understood to mean parts by weight.

I claim:

1. The process of making barbituric acids substituted in the 5-position by a single hydrocarbon radical which comprises hydrogenating barbituric acid in the presence of at least one molecular quantity of a member of the group consisting of aliphatic aldehydes, aliphatic ketones, and cycloaliphatic ketones so as to produce the said barbituric acids.

2. The process of making 5-monoalkyl-barbituric acids which comprises hydrogenating barbituric acid in the presence of at least one molecular quantity of an aliphatic aldehyde so as to produce the said barbituric acids.

3. The process of making 5-monoalkyl-barbituric acids which comprises hydrogenating barbituric acid in the presence of at least one molecular quantity of an aliphatic ketone so as to produce the said barbituric acids.

4. The process of making 5-monoalkyl-barbituric acids which comprises hydrogenating barbituric acid in the presence of at least one molecular quantity of a saturated aliphatic ketone so as to produce the said barbituric acids.

5. The process of making 5-monoalkyl-barbituric acids which comprises hydrogenating barbituric acid in the presence of at least one molecular quantity of an unsaturated aliphatic aldehyde so as to produce the said barbituric acids.

6. The process of making 5-isopropyl-barbituric acids which comprises hydrogenating barbituric acid in the presence of at least one molecular quantity of acetone so as to produce the said barbituric acids.

7. The process of making 5-(α-methylbutyl)-barbituric acid which comprises hydrogenating barbituric acid in the presence of at least one molecular quantity of methyl-n-propyl ketone so as to produce the said barbituric acid.

8. The process of making 5-n-butyl-barbituric acid which comprises hydrogenating barbituric acid in the presence of at least one molecular quantity of croton aldehyde so as to produce the said barbituric acid.

9. The process of making barbituric acids substituted in the 5-position by a single hydrocarbon radical which comprises hydrogenating barbituric acid in the presence of a solvent and in the presence of at least one molecular quantity of a member of the group consisting of aliphatic aldehydes, aliphatic ketones, and cycloaliphatic ketones so as to produce the said barbituric acids.

10. The process of making barbituric acids substituted in the 5-position by a single hydrocarbon radical which comprises catalytically hydrogenating barbituric acid in the presence of a hydrogenation catalyst selected from the group consisting of noble metal catalysts and nickel catalysts, and in the presence of at least one molecular quantity of a member of the group consisting of aliphatic aldehydes, aliphatic ketones, and cycloaliphatic ketones so as to produce the said barbituric acids.

11. The process of making barbituric acids substituted in the 5-position by a single hydrocarbon radical which comprises catalytically hydrogenating barbituric acid in the presence of a palladium-charcoal catalyst, and in the presence of one molecular quantity of a member of the group consisting of aliphatic aldehydes, aliphatic ketones, and cycloaliphatic ketones so as to produce the said barbituric acids.

12. The process of making barbituric acids substituted in the 5-position by a single hydrocarbon radical which comprises catalytically hydrogenating barbituric acid in the presence of a solvent, a hydrogenation catalyst selected from the group of noble metal catalysts and nickel catalysts, and in the presence of at least one molecular quantity of a member of the group consisting of aliphatic aldehydes, aliphatic ketones, and cycloaliphatic ketones so as to produce the said barbituric acids.

13. The process of claim 12 in which the hydrogenation is carried out at 80–110° C. and at a pressure of 200–1000 lbs. p. s. i.

14. The process of claim 12 in which a condensing agent is employed, said condensing agent being a member of the group consisting of ammonium acetate and ethylene diamine acetate.

15. The process of claim 12 in which the hydrogenation catalyst is a palladium-charcoal catalyst.

WILHELM WENNER.